United States Patent [19]
Sumihara et al.

[11] Patent Number: 5,448,129
[45] Date of Patent: Sep. 5, 1995

[54] ULTRASONIC MOTOR WITH VIBRATING BODY AND MOVING BODY DRIVEN THEREBY

[75] Inventors: Masanori Sumihara, Moriguchi; Katsu Takeda, Osaka; Takahiro Nishikura, Ikoma; Osamu Kawasaki, Tsuzuki, all of Japan

[73] Assignee: Matsushita Electric Industrial Co., Ltd., Osaka, Japan

[21] Appl. No.: 261,245

[22] Filed: Jun. 14, 1994

Related U.S. Application Data

[60] Continuation of Ser. No. 135,162, Oct. 12, 1993, abandoned, which is a division of Ser. No. 862,219, Apr. 2, 1992, Pat. No. 5,327,040.

[30] Foreign Application Priority Data

Apr. 2, 1991 [JP] Japan .................. 3-069727

[51] Int. Cl.⁶ .................................................. H02N 2/00
[52] U.S. Cl. ................................................... 310/323
[58] Field of Search ........................................ 310/323

[56] References Cited

U.S. PATENT DOCUMENTS

| | | | |
|---|---|---|---|
| 4,672,256 | 6/1987 | Okuno et al. | 310/323 |
| 4,692,650 | 9/1987 | Okumura et al. | 310/323 |
| 4,978,882 | 12/1990 | Kitani | 310/328 |
| 5,028,833 | 7/1991 | Kawai | 310/323 |
| 5,034,646 | 7/1991 | Shirasaki | 310/323 |
| 5,087,644 | 2/1992 | Tsutsumi et al. | 523/205 |
| 5,150,000 | 9/1992 | Imasaka et al. | 310/323 |
| 5,204,577 | 4/1993 | Watanabe et al. | 310/323 |
| 5,245,243 | 9/1983 | Ohnishi et al. | 310/323 |
| 5,311,094 | 5/1994 | Imasaka et al. | 310/323 |

FOREIGN PATENT DOCUMENTS

| | | | |
|---|---|---|---|
| 0317976 | 5/1989 | European Pat. Off. | H01L 41/08 |
| 0441540 | 8/1991 | European Pat. Off. | H01L 41/08 |
| 2579683 | 10/1986 | France | F03G 7/08 |
| 61-224882 | 10/1986 | Japan | H02N 2/00 |
| 62-58887 | 3/1987 | Japan | H02N 2/00 |
| 62-100178 | 5/1987 | Japan | H02N 2/00 |
| 63-136984 | 6/1988 | Japan | H02N 2/00 |
| 63-154075 | 6/1988 | Japan | H02N 2/00 |
| 63-174581 | 7/1988 | Japan | H02N 2/00 |
| 0248975 | 10/1989 | Japan | 310/323 |
| 0017874 | 1/1990 | Japan | 310/323 |

*Primary Examiner*—Thomas M. Dougherty
*Attorney, Agent, or Firm*—Wenderoth, Lind & Ponack

[57] ABSTRACT

An ultrasonic motor which achieves uniform contact between the vibrating body and the moving body and features high output transfer efficiency and high reliability, and by which the manufacturing process for the moving body thereof can be simplified and the moving body made lighter.

By comprising the moving body of a carbon fiber reinforced resin composite material reinforced by at least carbon fiber, and constructing the moving body with a both-side supported or single-side supported beam construction, elasticity according to the pressure of the ultrasonic motor can be imparted in the direction of pressure of the moving body. Thus, the undulations in the contact surface of the vibrating body and the moving body can be absorbed and stable, uniform contact can be assured, and long-term maintenance of a stable friction condition can be achieved.

2 Claims, 17 Drawing Sheets

$L/T \leq 2$
$H/T \leq 2$
$0.3mm \leq W_2 \leq 2.0mm$

ULTRASONIC MOTOR WITH VIBRATING BODY AND MOVING BODY DRIVEN THEREBY

This application is a continuation of now abandoned application, Ser. No. 08/135,162, filed Oct. 12, 1993, abandoned.

BACKGROUND OF THE INVENTION

The present invention relates to an ultrasonic motor which generates driving force by exciting an elastic wave using a piezoelectric element such as a piezoelectric ceramic or the like, and more particularly relates to the material and structure of the moving body of the ultrasonic motor.

The ultrasonic motor whereby driving force is generated by exciting a flexual vibration in a vibrating body comprised of a piezoelectric element has gained wide attention in recent years.

The prior art of the ultrasonic motor is described below with reference to the accompanying figures.

FIG. 11a is a partially cut perspective view showing essential parts of a conventional ring-shaped ultrasonic motor.

In FIG. 11a, a reference numeral 3 denotes a vibrating body comprised of a ring-shaped elastic base 1 with plural projections 1a and a ring-shaped piezoelectric element 2 attached to the bottom surface of the elastic body 1. A reference numeral 6 denotes a moving body, which is comprised of a ring-shaped elastic body 4 with an abrasion resistant friction member 5 attached thereto.

In this example of a conventional ultrasonic motor, a steel or a stainless steel is usually used for the materials of the elastic body 4, and the friction member 5 is bonded thereto with an adhesive or other means.

FIG. 11b shows a schematic cross-sectional view of a conventional ring-shaped ultrasonic motor In this ultrasonic motor, the vibrating body 3, supported by a ring-shaped seat 7, and the moving body 6 are held in pressure contact by a ring-shaped disc spring 8 to form an ultrasonic motor wherein the driving force is outputted via a bearing 9 attached to the moving body 6.

The operation of the conventional ring-shaped ultrasonic motor thus comprised is described below with reference to FIG. 13, which shows that the moving body 6 and vibrating body 3 are held in pressure contact, and a progressive wave of flexural vibration is excited in the vibrating body 3.

The progressive wave of flexural vibration is generated as follows. At first, a longitudinal vibration is caused in the piezoelectric element 2 by applying two AC voltages with a predetermined phase shift to two sets of driving electrodes arranged thereon, and, since the elastic base 1 works to resist this longitudinal action, a progressive wave of flexural vibration is set up in the vibrating body 3 by the same effect as a bimetal: Any given point on the surface of the vibrating body 3 follows an elliptical motion due to the progressive wave of flexural vibration. The projections 1a enlarge the lateral displacement of this elliptical motion (See $\zeta$ in FIG. 13). The moving body 6, pressed in friction contact with projections 1a of the vibrating body 3, is rotationally driven due to the enlarged lateral displacement.

Motors considered important from the view point of actual use in the prior art are as follows.

At first, it is necessary to maintain good contact between the moving body 6 and vibrating body 3 in order to guarantee a stable drive, since the former is driven to rotate by a friction force exerted thereon. In order for that, contact surfaces of the moving body 6 and the vibrating body 3 must be finished to have a flatness of high precision lower than several microns. Metal materials usually, and ceramic materials sometimes are used for the materials of the moving body 6 and vibrating body 3 to yield a rigidity such that the precision of flatness regarding contact surfaces is kept unchanged under the pressed state and a high precision of finishing.

Secondly, wear problems between contact surfaces of the moving body 6 and the vibrating body 3 are also important. Since a friction force is exerted between the contact surfaces during the operation of the ultrasonic motor, it is extremely important to minimize the wear due to the friction force in order to guarantee stable operation of the ultrasonic motor. Wear of the contact surface worsens the flatness and the contact state thereof resulting in a bad efficiency of the motor and generation of extraodinary noises. Further, power generated due to the wear lowers the credibility of the ultrasonic motor and a system including the same.

The abrasion resistive friction element 5 mentioned above is used as a countermeasure to the wear.

In Japanese laid-open publication Sho 62-58887, in the name of the assignee of this application, there is proposed a friction element made of a composite material of carbon fibre and resin. While high abrasion resistive materials quite different from materials used for the elastic body 4 are used for the friction element, it is also known to form the elastic body 4 from aluminum and the friction element 5 by oxidizing the surface of the elastic body 4 into an alumilite layer. However, a friction element formed by an alumilite layer is far inferior in abrasion resistivity when compared with the friction element disclosed in the above publication and, accordingly, it is impossible to guarantee stable operation for a long period.

There has also been proposed an ultrasonic motor wherein aluminum and aluminum alloy is Used for the material of the moving body 6, and the same is formed to have a cross section of a predetermined configuration as shown in FIG. 12 (See, for example, Japanese laid-open publication Sho 63-174581). This enables the realization of a quiet motor with a high efficiency.

However, the conventional ultrasonic motor is not satisfactory in efficiency, lifetime and further manufacturing cost. As to the efficiency, only 30% has been attained in the conventional motor at the maximum. In order to increase the efficiency, it becomes necessary to increase the precision in finishing the contact surfaces of the moving body and the vibrating body. However, this contradicts the reduction of the manufacturing cost.

SUMMARY OF THE INVENTION

Therefore, an object of the present invention is to provide an ultrasonic motor which will resolve the aforementioned problems. Namely, the present invention intends to provide an ultrasonic motor with a high efficiency, a long lifetime and a low manufacturing cost.

An ultrasonic motor which achieves these objects is comprised of a one-piece moving body composed of a carbon fiber reinforced resin composite material reinforced by at least a carbon fiber, and constructed such that elasticity according to the pressure of the ultrasonic motor is provided in the direction of force applied to the moving body.

According to the present invention, the efficiency and lifetime of the ultrasonic motor can be extremely enhanced for to the following reasons.

Because the effect (surface compensation effect) of absorbing the modulations in the contact surface of the vibrating body and the moving body can be imparted, and stable uniform contact can be assured by constructing the moving body with elasticity according to the pressure of the ultrasonic motor in the direction of force of the moving body, a progressive wave of flexural vibration due to the vibrating body can be efficiently transferred to the moving body, and thereby, the motor efficiency can be greatly improved.

In addition, because by constructing the moving body of a carbon fiber reinforced resin composite material reinforced using at least carbon fiber the composite material has excellent wear resistance and has the effect of applying an appropriate amount of lubrication to the friction contact surface, stable motor characteristics can be obtained even with long-term drive, and an ultrasonic motor with excellent long-term reliability can be achieved.

Moreover, because a simplified manufacturing process can be achieved because the number of parts in the moving body is reduced to-one-piece and an adhesion process can be eliminated by constructing the moving body of a carbon fiber reinforced resin composite material reinforced by at least carbon fiber, the weight of the moving body can be reduced, and therefore a lighter ultrasonic motor can be achieved.

In addition to omission of those processes, an advantage is that the moving body is easily formed by molding, resulting in an extremely low manufacturing cost as well as small weight.

BRIEF DESCRIPTION OF DRAWINGS

The present invention will be understood from the detailed description given below and the accompanying diagrams, wherein.

DESCRIPTION OF PREFERRED EMBODIMENTS

Before entering concrete explanation of the embodiments, technical merits on forming the moving material with a resin material will be explained in detail.

Figure 13:
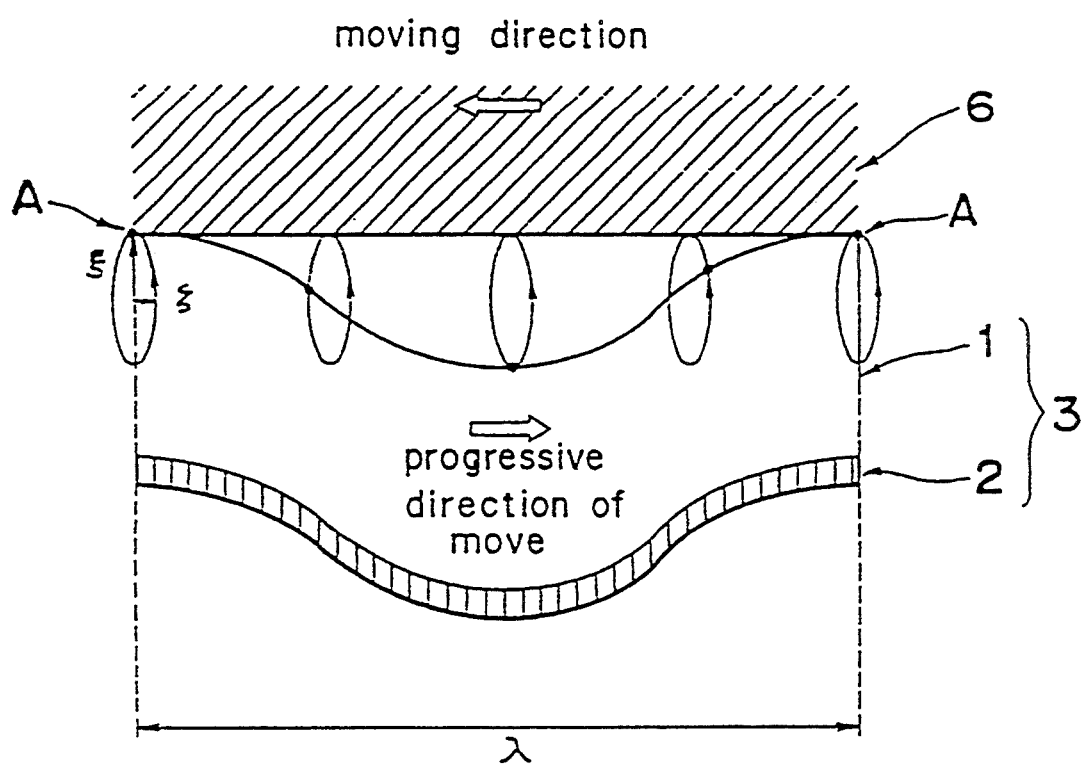
FIG. 13 is an explanatory view illustrating the operating principle of the ultrasonic motor.

The ultrasonic motor is a motor which, using the operating principle shown in FIG. 13, excites a progressive wave of flexural vibration with an amplitude ($\xi$ in FIG. 13) of plural microns in a moving body comprised of a piezoelectric body and elastic circuit board, expands the lateral displacement ($\zeta$ in FIG. 13 caused by this progressive wave by means of projecting bodies, and drives a moving body provided with pressurized contact against the ends of the projecting bodies.

Therefore, to efficiently transfer to the moving body the progressive wave of flexural vibration induced by the vibrating body and assure long-term reliability, a moving body which meets the following requirements and contact between the moving body and the vibrating body are required.

a) The moving body shall have dynamic elasticity in the macro length at the wavelength level of the progressive wave of flexural vibration induced by the vibrating body. This is necessary to achieve uniform contact 6f the moving body at approximately the apex of all waves in the progressive wave, and to efficiently transfer to the moving body the progressive wave of flexural vibration induced by the vibrating body.

As a guide to this dynamic elasticity, the amount of elastic deformation in the vertical direction of the moving body material when pressure is applied shall be within the range of the amplitude of the progressive wave, and is preferably approximately equal to the amplitude of the vibrating body. Therefore, the optimum level of dynamic elasticity cannot be unconditionally defined .and is variable with the wavelength of the progressive wave (See λ in FIG. 13) excited by the piezoelectric body and the pressure applied by the ultrasonic motor, and must be optimally designed according to the drive conditions of the ultrasonic motor.

b) The moving body must have rigidity through the micro length of a level of approximately the contact area (A in FIG. 13) of the progressive wave of flexural vibration induced by the vibrating body. This is necessary to reduce the output transfer loss due to elastic deformation in the contact area of the moving body.

As a guide to this rigidity, it is necessary to suppress as much as possible flexural deformation of the moving body in the lateral direction due to the lateral displacement of the progressive wave, and by way of example it is preferable for the modulus of elasticity of the moving body material to be $\geq 1000$ kfg/mm$^2$. Moreover, in addition to this lateral displacement, it is necessary to also suppress the elastic deformation in the horizontal direction of the moving body due to external loads, and the ideal rigidity required in the moving body cannot be unconditionally defined and must be optimally designed according to the drive conditions of the ultrasonic motor.

c) The moving body shall have a suitable lubricity. This is necessary to maintain a stable friction condition and to reduce wear.

As a guide to this lubricity, the coefficient of kinetic friction of the moving body material is preferably in the range 0.15~0.40.

d) The moving body shall have static elasticity according to the applied pressure of the ultrasonic motor. This is necessary to absorb the undulations in the contact surfaces of the moving body and the vibrating body, and to assure uniform contact.

As a guide to this static elasticity, the machining precision of the vibrating body and the molding precision of the moving body shall vary according to the pressure applied by the motor, but distortion of the moving body when pressure is applied is preferably 1~10 μm.

The conventional ultrasonic motor using the elastic body made of a metal material is difficult to satisfy these conditions a) to d) and, accordingly, it is difficult to obtain ultrasonic motors with a high efficiency and a long lifetime. Farther, as stated above, the conventional ultrasonic motors are not satisfactory at various points, such as the manufacturing cost and the like.

The present invention is made based on a new idea to form the moving body with a resin material and, therefore, is able to provide ultrasonic motors excellent in various points such as efficiency, lifetime and cost.

More concretely, the moving body according to the present invention is made of a carbon fiber reinforced resin composite material which is reinforced using at least carbon fibers and, accordingly, the micro-length rigidity is enhanced by carbon fibers and the macro-length dynamic elasticity is obtained by the resin.

Reasons for using carbon fiber include its effectiveness improving rigidity in the moving body when compared with any other type of inorganic fiber, such as glass fiber of the same given content, the ability to increase moving body rigidity with a lower fiber content, and to improve the mechanical strength of the moving body. In addition to the above, a suitable lubricity can be achieved in the wear interface by using carbon fiber.

Moreover, by constructing the moving body to have elasticity corresponding to the amount of pressure applied to the ultrasonic motor, undulations in the contact surface of the moving body and the vibrating body can be absorbed, and a uniform contact can be assured.

Meanwhile, it is desirable to use a press force between the moving body and the vibrating body smaller than that used in the case of the moving body of a metal material since in the moving body is formed with a resin compound in the present invention, a press force within a range 0.08 to 0.8 kgf/cm$^2$ is desirably employed.

Thus, the ultrasonic motor according to the present invention is especially useful for driving a light load for uses such as a lens driver in a photographic camer, a VTR camera or the like.

The preferred embodiments which achieve the aforementioned moving body construction are described hereinbelow with reference to the accompanying figures.

First preferred embodiment

Figure 1A:
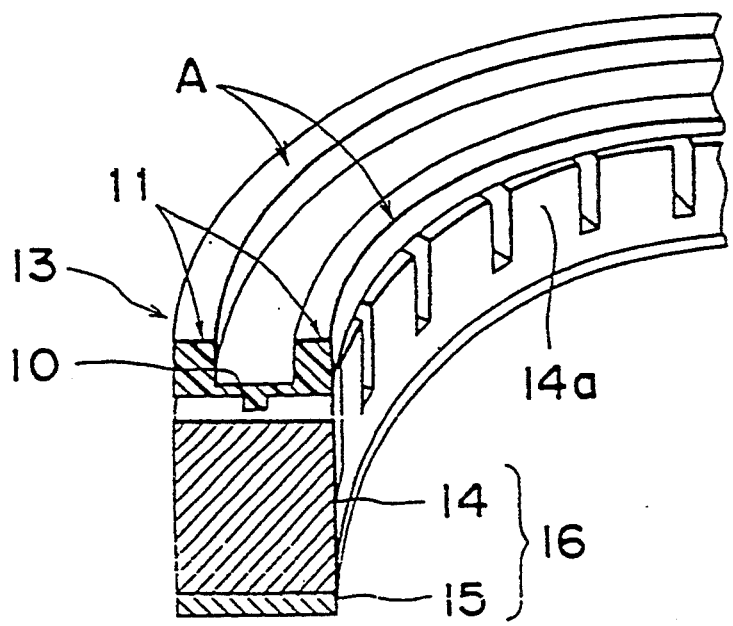
FIG. 1a is a partial perspective view of the major components of an ultrasonic motor according to a first preferred embodiment of the present invention.
Figure 1B:
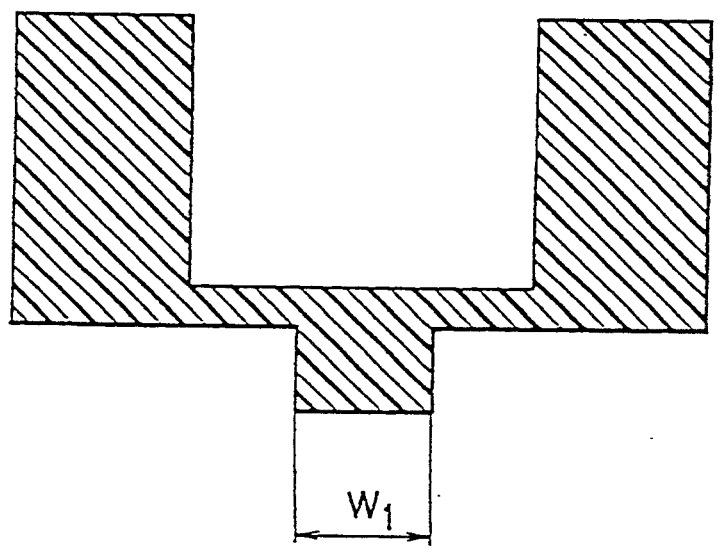
FIG. 1b is an enlarged sectional view of a moving body shown in FIG. 1a, FIG. 1c is a cross-sectional view of a ring-shaped ultrasonic motor embodying the structure shown in FIG. 1a, FIG. 1d is a partial perspective view of the major components of a linear ultrasonic motor according to the first preferred embodiment.

The major structural components of the ultrasonic motor according to the first embodiment are shown in FIG. 1a. As shown in FIG. 1a, a reference numeral 13 denotes a moving body having a beam structure supported at both ends thereof so as to be elastic in a direction vertical to a horizontal plane indicated by A. The moving body is of one piece and comprises a moving body beam 10, first moving body projections 11 extending at both sides of the moving body beam 10, and a second moving body projection 12 extending from the moving body beam 10 at the side in contact with a vibrating body 16. It is to be noted that the vibrating body 16 is a vibrating body with a piezoelectric body 15 coupled to an elastic base board 14 with rectangularly shaped projections 14a. Moreover, the ultrasonic motor is constructed by applying pressure through the vibrating body 16 to surface A of the first moving body projections 11, to cause contact with the vibrating body 16 being at the second moving body projection 12.

If the width $W_1$, of the second projection 12 is smaller than 0.3 mm, the press are concentrates thereto resulting in poor long-term reliability due to heavy wear a. On the other hand, if the width $W_1$, is larger than 2.0 mm, it becomes difficult to assure a stable and uniform contact and, thereby, it is difficult to unify the performance of the motor. Thus the width $W_1$, should be limited within a range 0.3 mm to 2.0 mm.

Figure 1C:
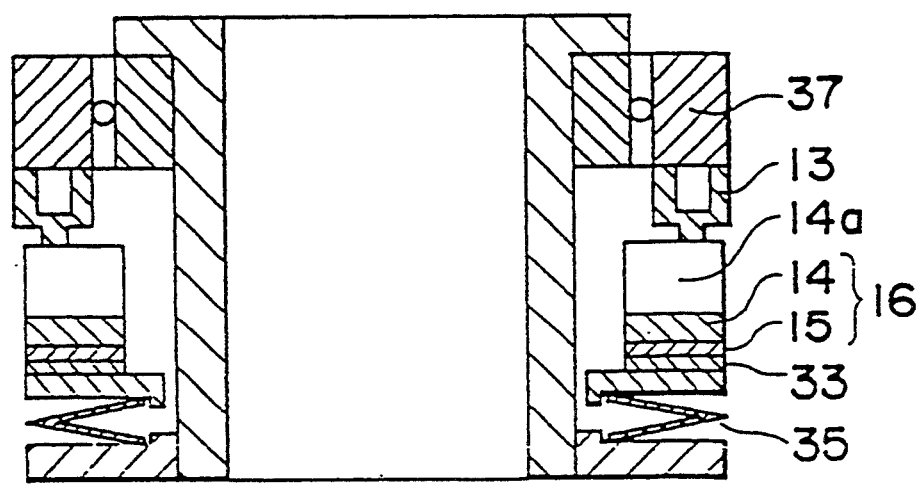

FIG. 1c is a schematic cross-sectional view of the ring-shaped ultrasonic motor embodying the first preferred embodiment shown in FIG. 1a. As shown therein, the vibrating body 16, supported by an annular seat 33, and the moving body 13 are held in pressure contact by a disc spring 35 to form a motor wherein rotation of the moving body 13 is outputted via a bearing 37 as the driving force.

Figure 1D:
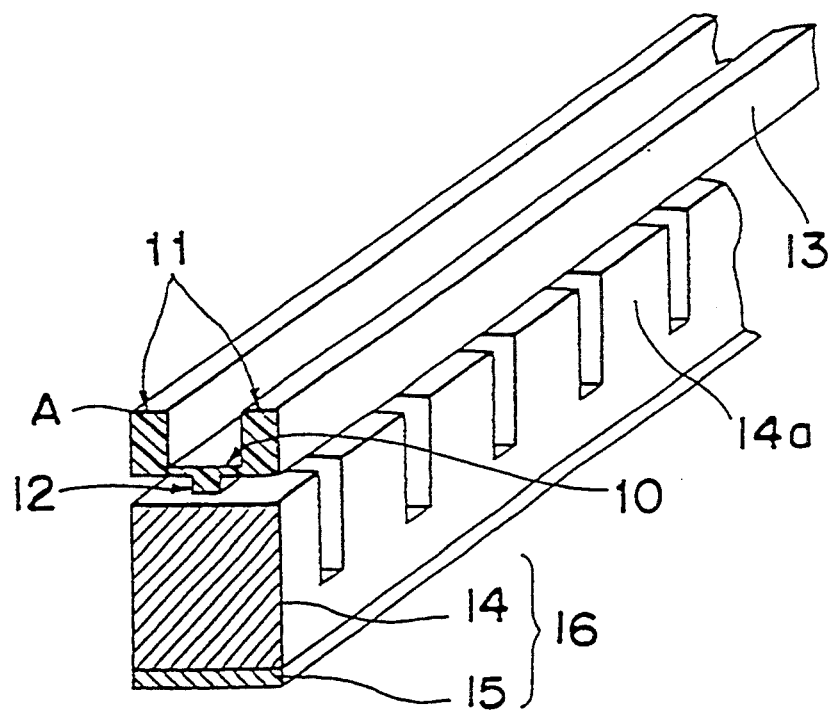

The present preferred embodiment is not limited to the ring-shaped motor and is applicable to a linear motor as shown in FIG. 1d.

Second preferred embodiment

Figure 2A:
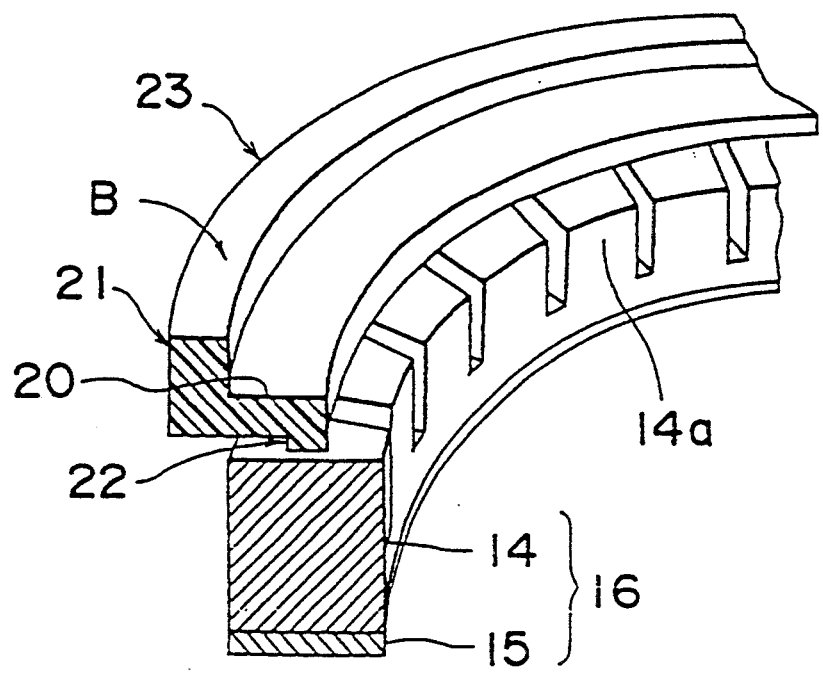
FIG. 2a is a partial perspective view of the major components of an ultrasonic motor according to a second preferred embodiment of the present invention.

FIG. 2a shows and ultrasonic motor according to a second preferred embodiment of the present invention in which a moving body 23 is supported at one side so that it has an elasticity in the direction of the press force. Specifically, this moving body comprises a moving body beam member 20, a first moving body projection 21 extending from one side of the beam member 20, and a second moving body projection 22 which extends from the other one side of the beam member 20. It is to be noted that the vibrating body 16 is a vibrating body with a piezoelectric body 15 coupled to an elastic base board 14 with rectangularly shaped projections 14a. Moreover, the ultrasonic motor is constructed by applying pressure with the vibrating body 16 to surface B of the first moving body projections 21, to with contact with the vibrating body 16 being at the second moving body projection 22.

Figure 2B:
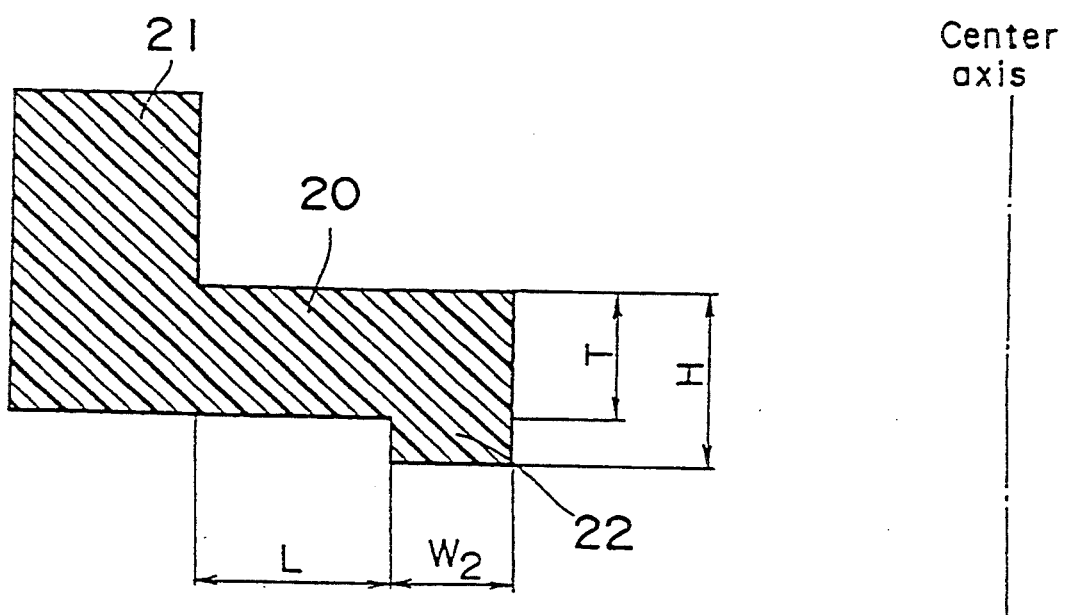
FIG. 2b is an enlarged sectional view of a moving body shown in FIG. 2a, FIG. 2c is a cross-sectional view of a ring-shaped ultrasonic motor embodying the structure shown in FIG. 2a, FIG. 2d is a partial perspective view of the major components of a linear ultrasonic motor according to the second preferred embodiment.

FIG. 2b is an enlarged sectional view of the moving body in which the width and thickness of the beam member 20 are given as L and T, respectively and the width and height of the second projection 22 are given as $W_2$ and H, respectively.

Figure 2C:
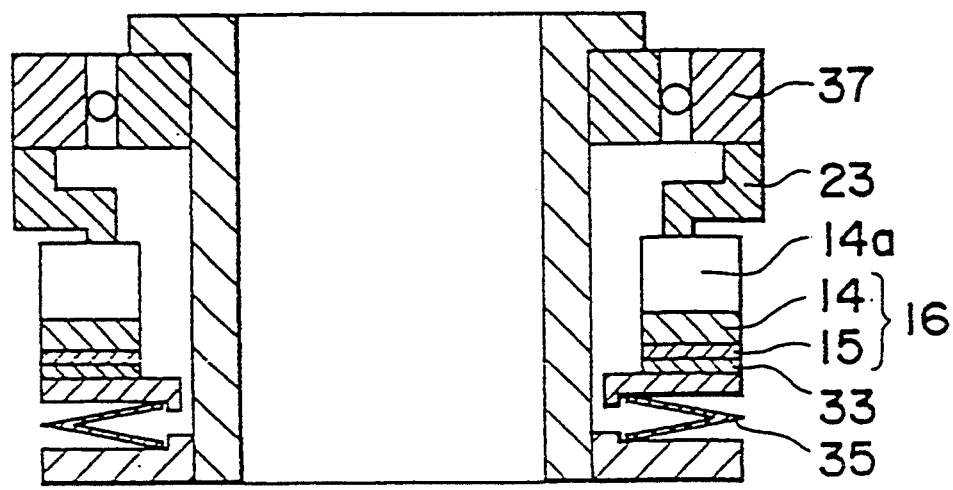

FIG. 2c is a schematic cross sectional view of a ring-shaped ultrasonic motor embodying the second preferred embodiment shown in FIG. 2a. As shown therein, the vibrating body 16, supported by an annular seat 33, and the moving body 23 are held in pressure contact by a disc spring 35 to form a motor wherein rotation of the moving body 23 is outputted via a bearing 37 as the driving force.

With respect to the ratio (L/T) of the beam member 20, if it is larger than 2, the mechanical strength of the moving body 23 is short and the transmission efficiency of output is undesirably lowered due to co-vibration of the beam member 20. Accordingly, the ratio should be designed to be smaller than 2.

With respect to the ratio (H/T) of the height H of the second projection 22 to the thickness T of the beam member 20, if it is larger than 2, the mechanical strength of the moving body 16 is short and the second projection 22 is deformed when an external load is applied thereto, and, thereby the transmission efficiency of output is undesirably lowered. Thus, this ratio should be designed to be smaller than or equal to 2.

Further, if the width $W_2$ of the second projection 22 is small than 0.3 mm, the pressure concentrates too much thereto resulting in poor long-term reliability due to heavy wear. On the other hand, if it is larger than 2.0 mm, it becomes difficult to assure, a stable and even contact and, thereby, it is difficult to unify the performance of the motor. Thus the width $W_2$ should be designed within a range 0.3 mm to 2.0 mm.

The dimensions of the moving body are desirably designed so as to satisfy the above conditions in order to transmit the progressive wave of the flexural vibration of the vibration body efficiently.

In addition, because the elasticity in the direction of force and the rigidity required for the moving bodies 13 and 23 differ with the applied pressure of the ultrasonic motor, the rigidity and elasticity in the direction of force of moving bodies 13 and 23 can be adjusted by adjusting the width and thickness of the moving body beam member and the carbon fiber content of the carbon fiber reinforced resin composite material.

More specifically, the moving body 23 is formed so as to have dimensions such that the ratio (L/T) is 0.88, the ratio (H/T) is 1.18 and the width $W_2$ is 1.0 mm by injection molding a mixture of 30 wt % carbon fiber and 70 wt % polyphenylene sulfide resin. By setting the moving body 23 pressed in contact with the ring-shaped vibrating body 16 of diameter 48 mm under a press force of a 0.13 kgf/cm$^2$ by means of disc spring (not shown in FIG. 2a), a ring-shaped ultrasonic motor is composed.

The ultrasonic motor thus comprised was tested to estimate the properties thereof.

First, the motor efficiency was improved, up to 44% at the maximum. Thus an improvement of about 50% is obtained in comparison with the conventional motor.

Next, it was confirmed that no change in the property of the motor was observed even after $2 \times 10^6$ revolutions.

Figure 12:
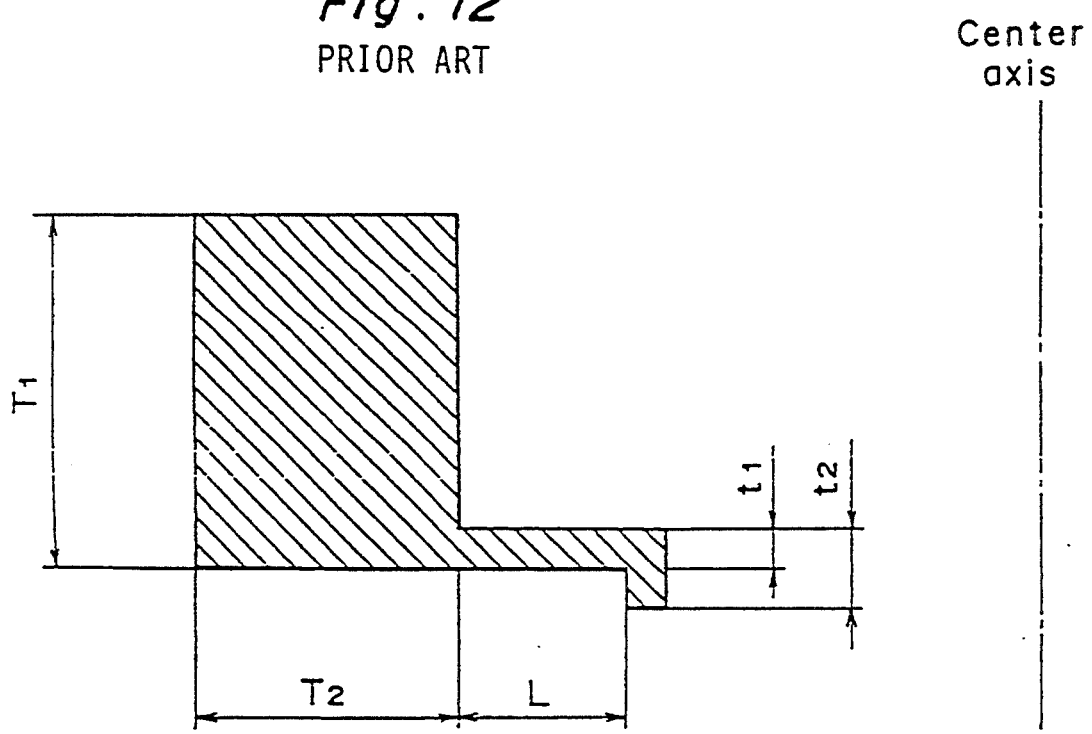
FIG. 12 is a sectional view of a moving body of a conventional ring-shaped ultrasonic motor.

To compare the ultrasonic motor according to the second embodiment with the conventional motor, especially with respect to the moving body, an ultrasonic motor was fabricated using a moving body made of aluminum having the cross section shown in FIG. 12 which was proposed in the Japanese laid-open publication Sho 63-174581. The ratio of the width L with the thickness $t^1$ regarding the flange of the moving body is set at 6.5, the ratio of the height $t^2$ of the contacting part with the thickness $t^1$ of the flange is set at 2.5 and the height $T^1$ and the width of the moving body are set at 3.2 and 2.0 mm, respectively, so that the conditions of the dimensions disclosed in the above publication are satisfied. Further, the contact surface of the moving body was subjected to alumilite processing at a low temperature to enhance the wear resistance thereof.

Other factors, such as configuration and dimension of the vibrating body, the press force between the moving body and the vibrating body and the like were made the same as those of the motor according to the second preferred embodiment in order to estimate the efficiency and lifetime on the same basis.

According to the results obtained regarding the conventional ultrasonic motor, the maximum efficiency was 30% at most, and rotation became unstable when the accumulated number of revolutions exceeded $4 \times 10^5$ revolutions.

Thus, the ultrasonic motor according to the present invention is superior to the conventional one in various factors such as efficiency, lifetime, manufacturing cost, weight and the like.

In the second preferred embodiment, the press force between the moving body and the vibrating body can be chosen within a range 0.08 to 0.8 kgf/cm$^2$ wherein a maximum efficiency of more than 40% can be obtained.

Figure 2D:
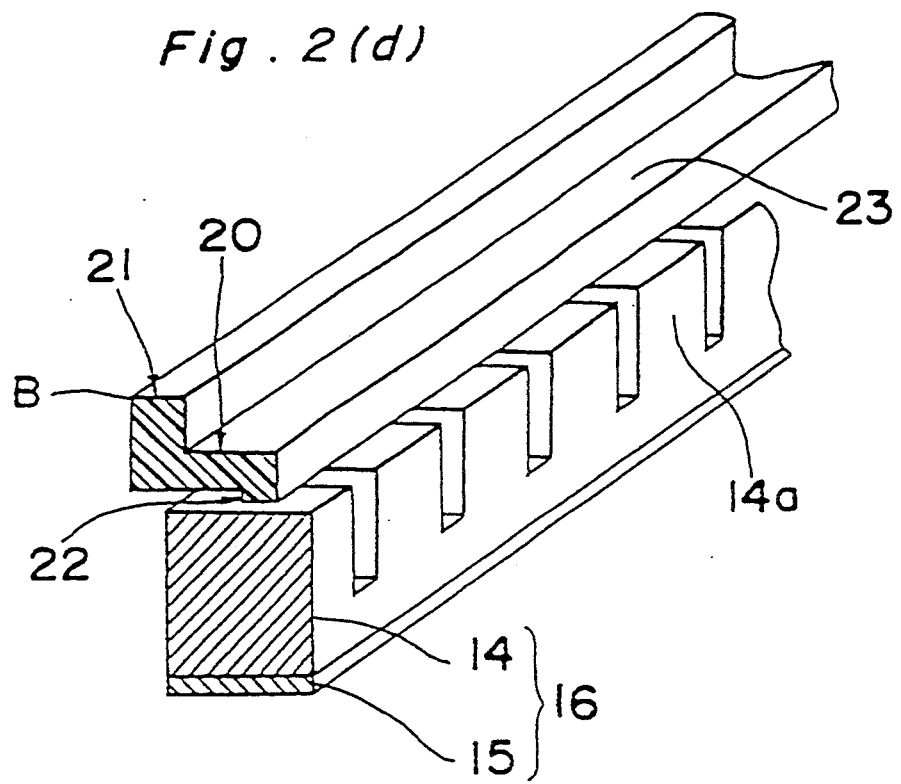

The present preferred embodiment is not limited to the ring-shaped motor, and is applicable to a linear motor as shown in FIG. 2d.

Third preferred embodiment

Figure 3A:
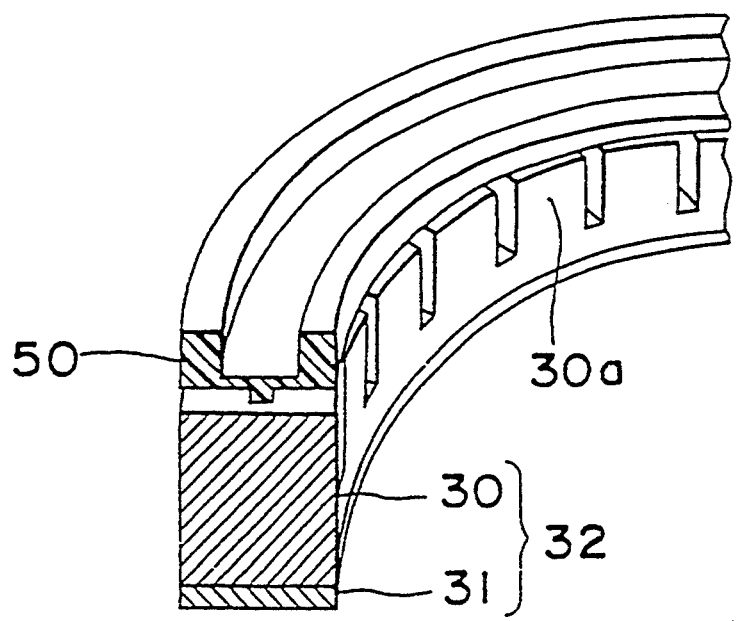
FIG. 3a is a partial perspective view of the major components of an ultrasonic motor according to a third preferred embodiment of the present invention.

The ultrasonic motor according to the third preferred embodiment of the present invention has a fundamental structure such that a moving body 50 is pressed in contact with a vibrating body 32 by a disc spring (not shown), as shown in FIG. 3a.

First, the ring-shaped vibrating body 32 was constructed by affixing with adhesive a ring-shaped piezoelectric body 31 to the bottom of a stainless steel, ring-shaped elastic circuit board 30 with plural rectangular projections 3a. By injection molding a mixture of 30 wt % carbon fiber and 70 wt % polyphenylene sulfide resin, a moving body 50 of a carbon fiber reinforced resin composite material with a ring shape and specific gravity of 1.45 is obtained.

Figure 3B:
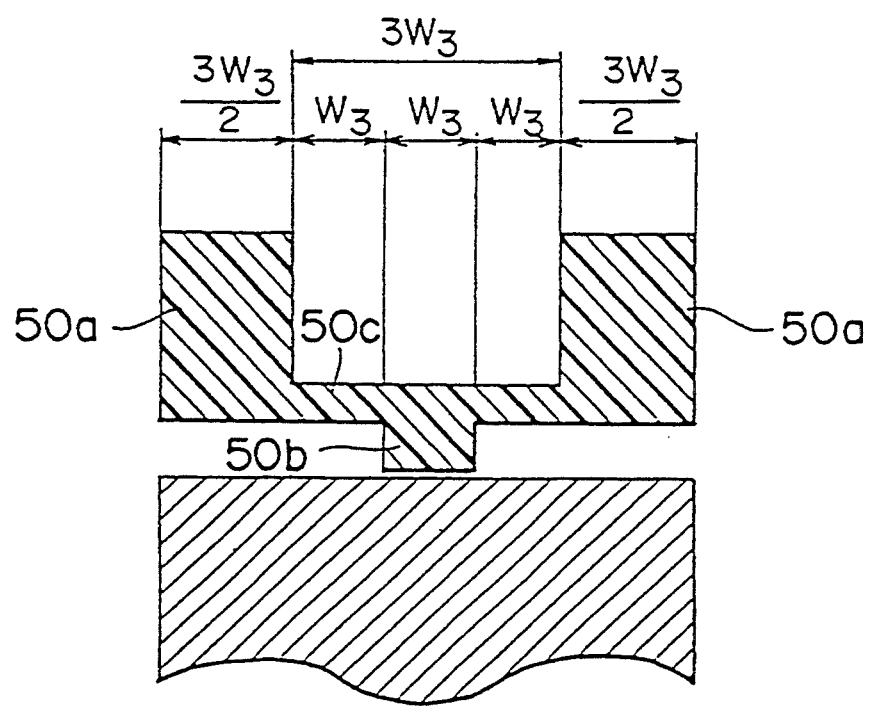
FIG. 3b is an enlarged sectional view of a moving body shown in FIG. 3a, FIG. 3c is a cross-sectional view of the ring-shaped ultrasonic motor embodying the structure shown in FIG. 3a, FIG. 4a is a partial perspective view of a major components of an ultrasonic motor according to a fourth preferred embodiment of the present invention.

FIG. 3b shows a cross-section of the moving body, in which dimensions of respective parts of the moving body 50 are represented in units of a width $W_3$ of the moving body second projection 50b 50b which contacts the vibrating body 32. Namely, the length of a moving body beam portion 50c and the width of a moving body first projection 5a are $3W_3$ and $3/2\ W_3$, respectively.

Figure 3C:
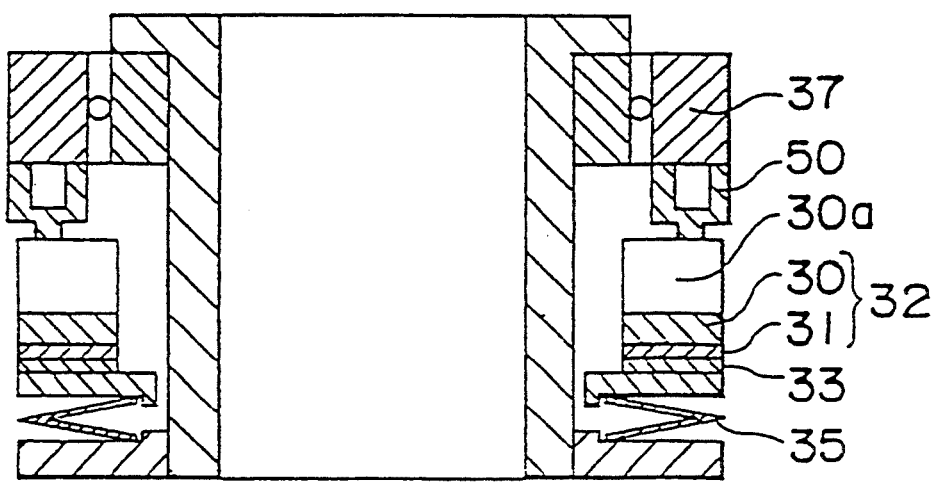

As shown in FIG. 3c a cross-section of a ring-shaped ultrasonic motor embodying the structure shown in FIG. 3a, the vibrating body 32 supported by an annular seat 33 and the moving body 50 are held in pressure contact by a disc spring 35 to form a motor wherein rotation of the moving body 50 is outputted via a bearing 37.

In third preferred embodiment of the present invention it is also possible to attain same effects as in the first preferred embodiment by optimizing dimensions of the respective parts in accordance with the press force.

Fourth preferred embodiment

Figure 4A:
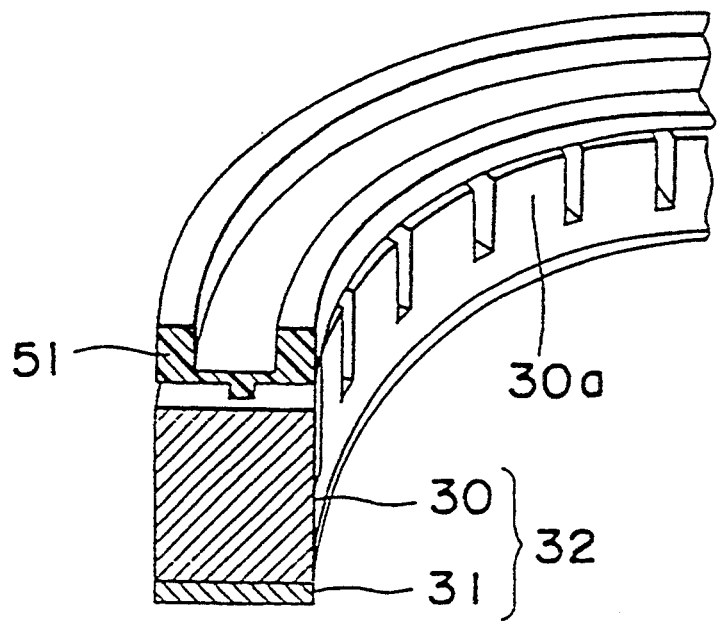
FIG. 4b is an enlarged sectional view of a moving body shown in FIG. 4a, FIG. 5a is a partial perspective view of the major components of an ultrasonic motor according to a fifth preferred embodiment of the present invention.

First, a moving body 51 of a carbon fiber reinforced resin composite material with a ring shape and specific gravity of 1.47 is obtained by injection molding a mixture of 30 wt % carbon fiber and 70 wt % polyether sulfone resin. Furthermore, by setting the moving body 51 pressed in contact with the vibrating body 32 by means of disc springs (not shown in the figures) as with the first embodiment, a ring-shaped ultrasonic motor as illustrated in FIG. 4a can be composed.

Figure 4B:
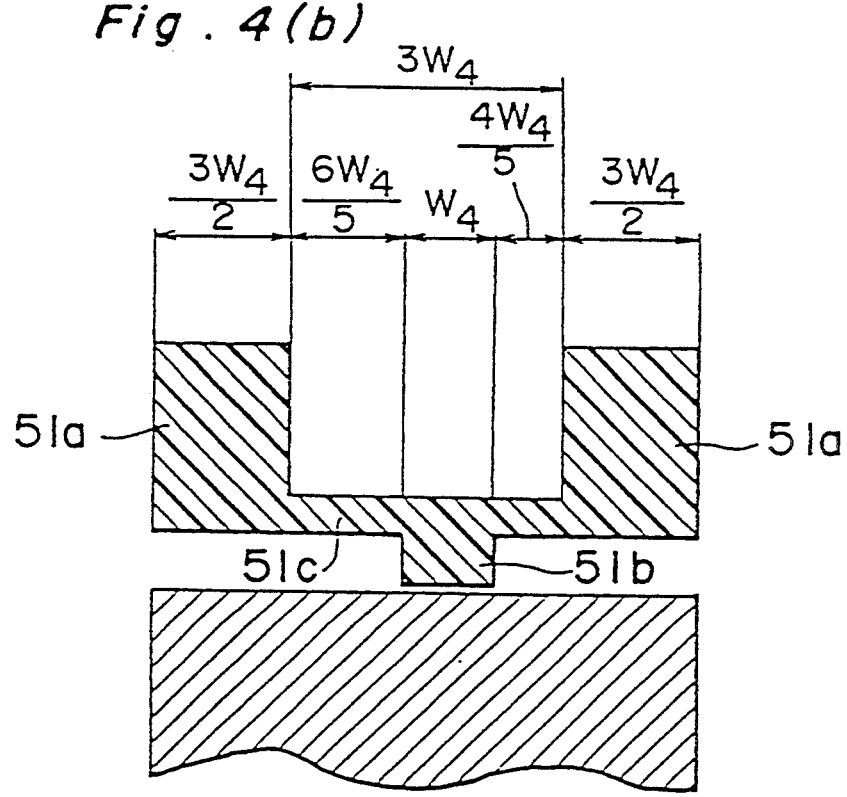

As shown in FIG. 4b, if the width of a second projection 51b which contacts with the vibrating body 32, is $W_4$, the width of a moving body beam member 51c in this moving body 51 is $3W_4$, first projections 51a have a width of $3/2\ W_4$, the second projection 51b has a width of $W_4$, and the second projection 51b of the moving body 51 is formed eccentrically inside from the center of the beam member 51c to contact the vibrating body 32.

Specifically, it is possible to achieve a surface compensation effect greater at the outside circumference side than the inside circumference of the moving body by providing the second projections on the inside circumference of the moving body beam member. Thus a moving body design which accounts for radial amplitude in which the amplitude in the radial direction of the ring-shaped vibrating body is greater at the outside circumference can be achieved.

The same merits as in the first embodiment can be obtained.

Fifth preferred embodiment

First, a moving body 52 of a carbon fiber reinforced resin composite material with a ring shape and specific gravity of 1.45 is obtained by injection molding a mixture of 30 wt % carbon fiber and 70 wt % polyphenylene sulfide resin. Furthermore, by setting the moving body 52 in pressed contact with the vibrating body 32 by means of disc springs (not shown in the figures) as with the first embodiment, a ring-shaped ultrasonic motor as illustrated in FIG. 5a can be composed.

Figure 5C:
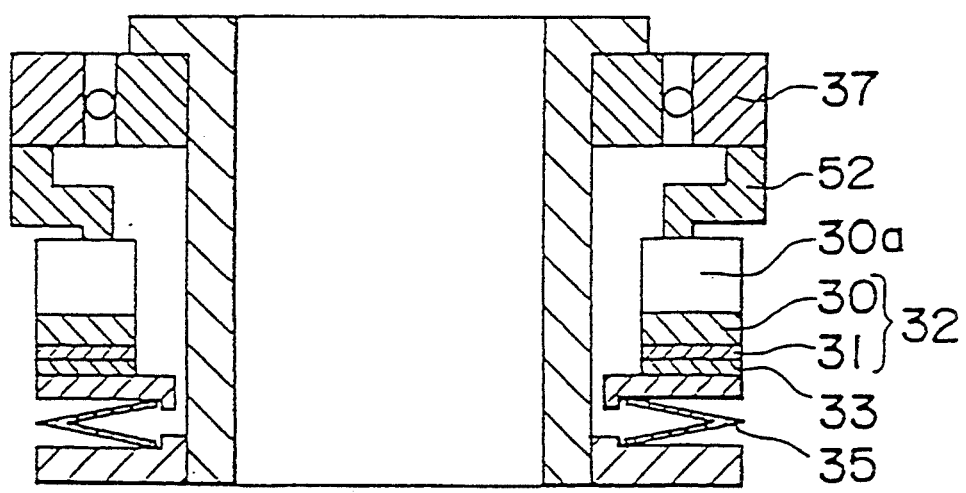
FIG. 5b is an enlarged sectional view of a moving body shown in FIG. 5a, FIG. 5c is a cross-sectional view of a ring-shaped ultrasonic motor embodying the structure shown in FIG. 5a, FIG. 6a is a partial perspective view of the major components of an ultrasonic motor according to a sixth preferred embodiment of the present invention.
Figure 5A:
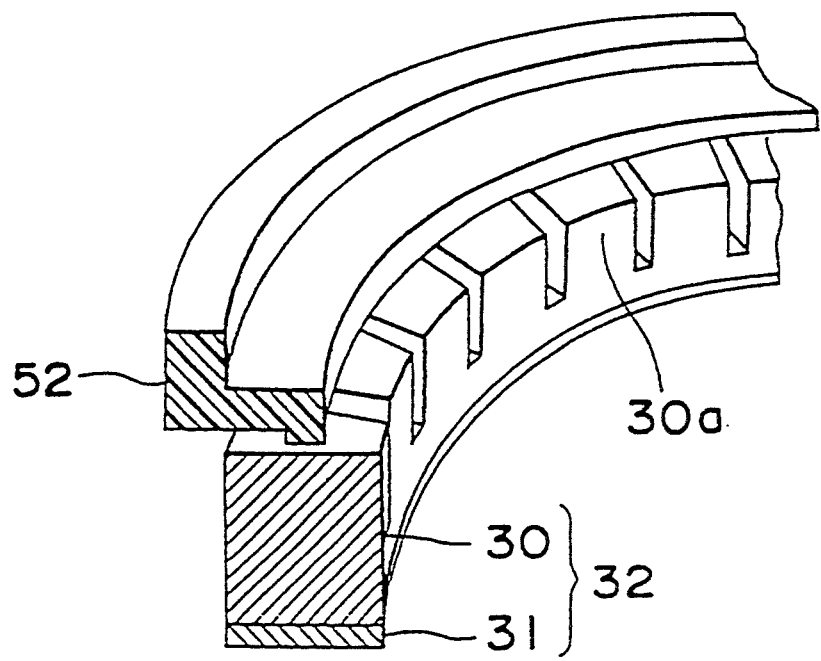
Figure 5B:
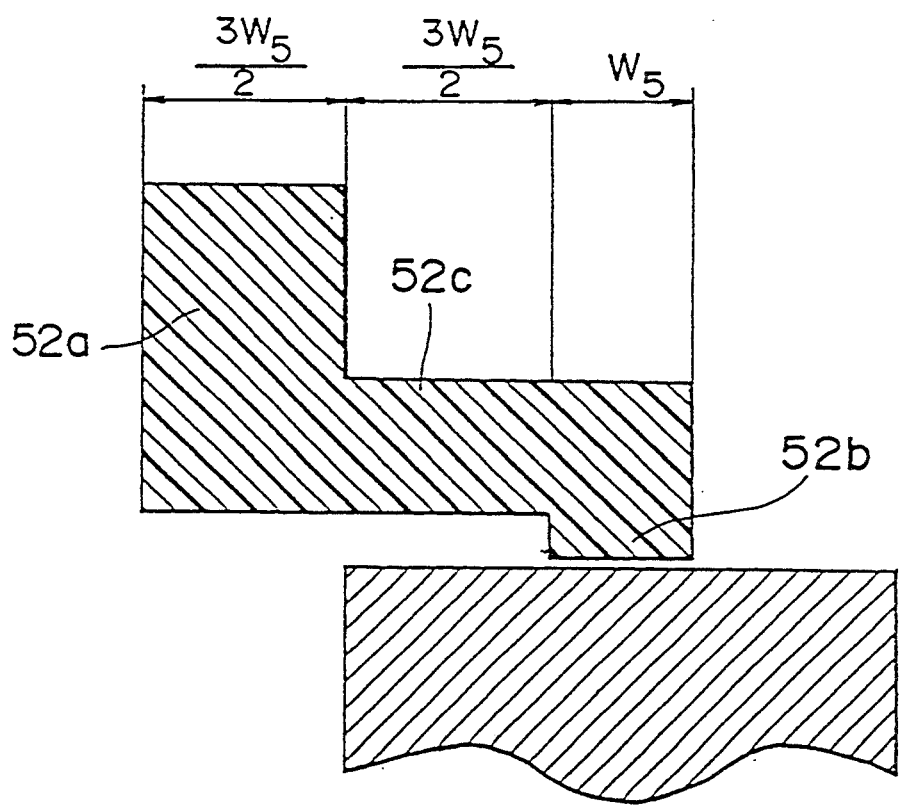

As shown in FIG. 5b, if the width of a second projection 52b, which contacts with the vibrating body, is $W_5$, the width of a moving body beam member 52d in this moving body 52 is $3W_5/2$, and first projections 52a have a width of $3W_5/2$ projecting from the outside circumference of the beam member.

As shown in FIG. 5c a cross-section of the ring-shaped ultrasonic motor embodying the structure shown in FIG. 5a, the vibrating body 32 supported by an annular seat 33 and the moving body 52 are held in pressure contact by a disc spring 35 to form the motor, wherein rotation of the moving body 52 is outputted via a bearing 37.

It is to be noted that the width of the moving body beam member shall not be thus limited, but because the optimum width and thickness of the moving body beam member and the optimum height of the second projection of the moving body differ with the pressure applied by the ultrasonic motor, it is necessary to be able to adjust the flexibility in the direction of force of the moving body beam member and the height of the second moving body projections.

Sixth preferred embodiment

Figure 6A:
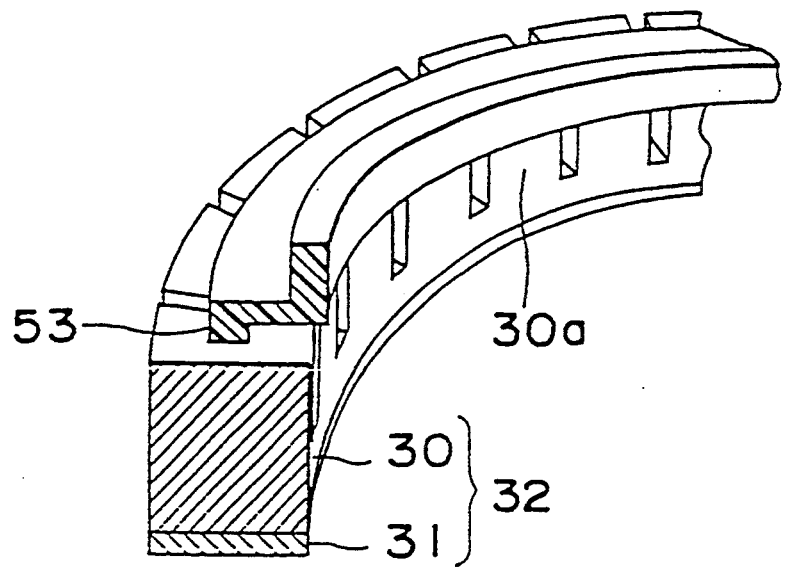
FIG. 6b is an enlarged sectional view of a moving body shown in FIG. 6a, FIG. 7a is a partial perspective view of the major components of an ultrasonic motor according to a seventh preferred embodiment of the present invention.

First, a moving body 53 of a carbon fiber reinforced resin composite material with a ring shape and specific gravity of 1.44 is obtained by injection molding a mixture of 30 wt % carbon fiber and 70 wt % polyether ether ketone resin. Furthermore, by setting the moving body 53 in pressed contact with the vibrating body 32 by means of disc springs (not shown in the figures) as with the first embodiment, a ring-shaped ultrasonic motor as illustrated in FIG. 6a can be composed.

Figure 6B:
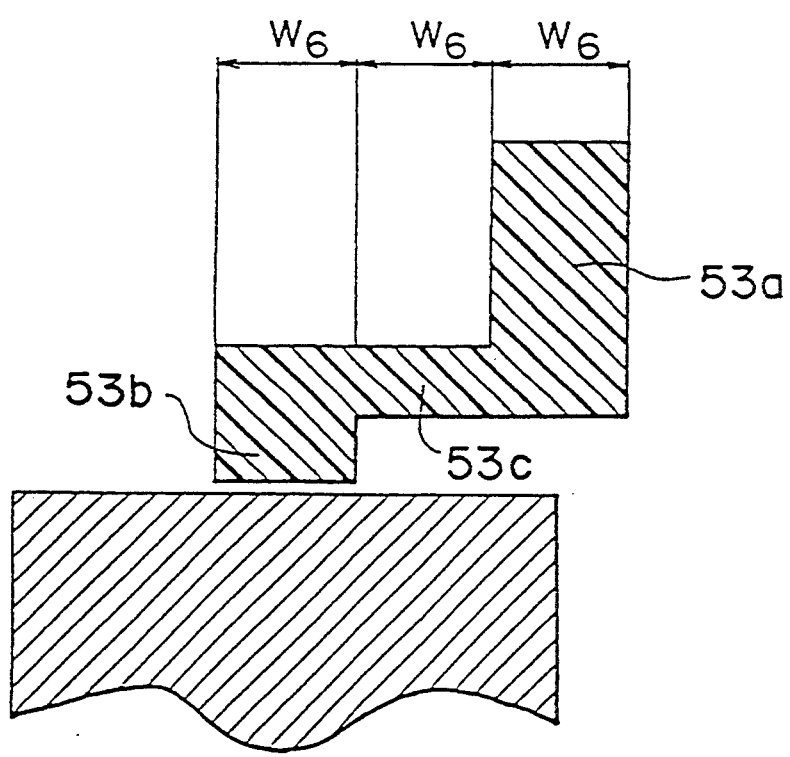

As shown in FIG. 6b, if a width of the second projection 53b, which contacts with the vibrating body 32, is $W_6$, the width of a moving body beam member 53c in this moving body 53 is $W_6$, a first projection 53a extending from the inside circumference of the beam member has a width of $W_6$, the second projection 53b extends from the inside circumference of the beam member, and, and accordingly, the moving body contacts the vibrating body 32 at a width of $W_6$.

In this preferred embodiment, the second projection 53b is formed on the outer side of the beam member 53c and, therefore, the diameter of the moving body can be reduced to yield a more compact and lighter motor.

Seventh preferred embodiment

Figure 7A:
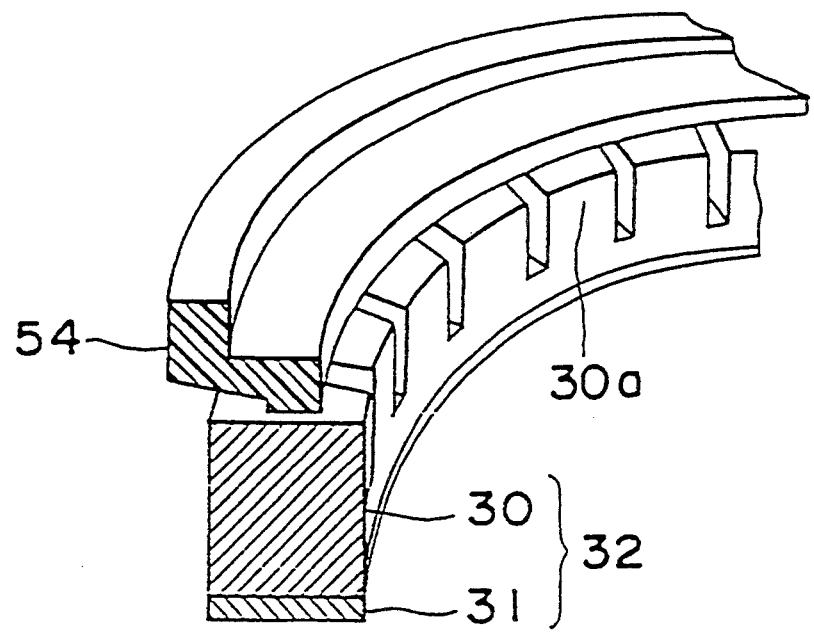
FIG. 7b is an enlarged sectional view of a moving body shown in FIG. 7a, FIG. 8a is a partial perspective view of the major components of an ultrasonic motor according to an eighth preferred embodiment of the present invention.

First, a moving body 54 of a carbon fiber reinforced resin composite material with a ring shape and specific gravity of 1.47 is obtained by injection molding a mixture of 30 wt % carbon fiber and 70 wt % polyether sulfone resin. Furthermore, by setting the moving body 54 in pressed contact with the vibrating body 32 by means of disc springs (not shown in the figures) as with the first embodiment, a ring-shaped ultrasonic motor as illustrated in FIG. 7a can be composed.

Figure 7B:
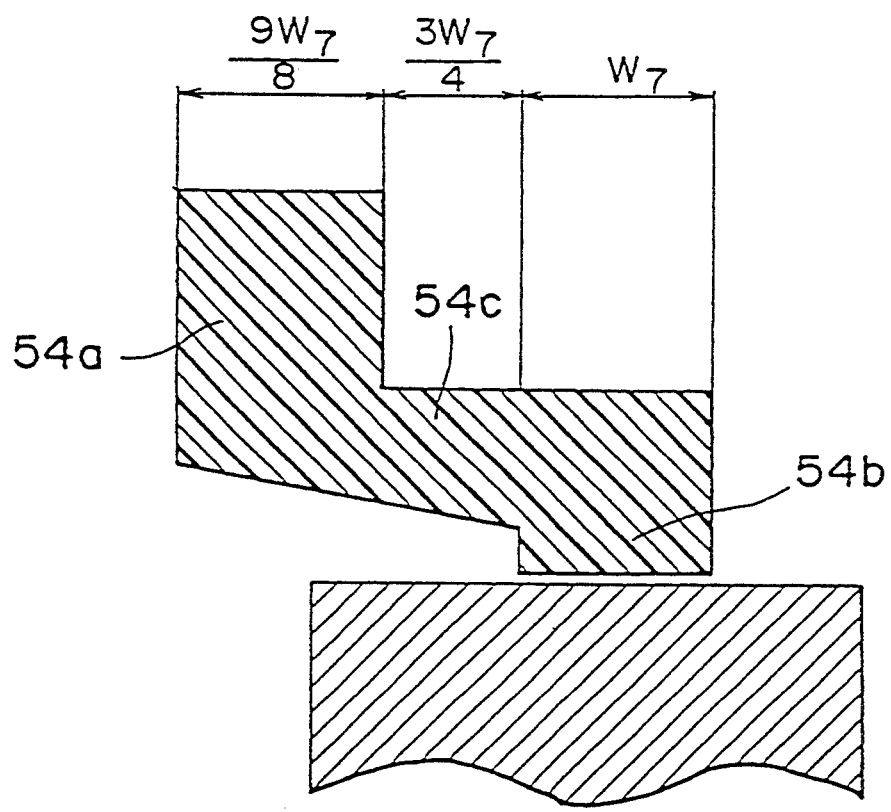

As shown in FIG. 7b, if the width of a second projection 54b, which contacts with the vibrating body 32, is $W_7$, the width of a moving body beam member 54c in this moving body 54 is $3W_7/4$, a first projection 54a projecting from the outside circumference of the beam member has a width of $9W_7/8$, and tapers can be provided on both ends of the contact side of the moving body beam member.

By thus providing tapers at the contact side of the moving body beam member, the surface compensation effect can increased and the rigidity in the contact part of the moving body can be increased.

Eighth preferred embodiment

Figure 8A:
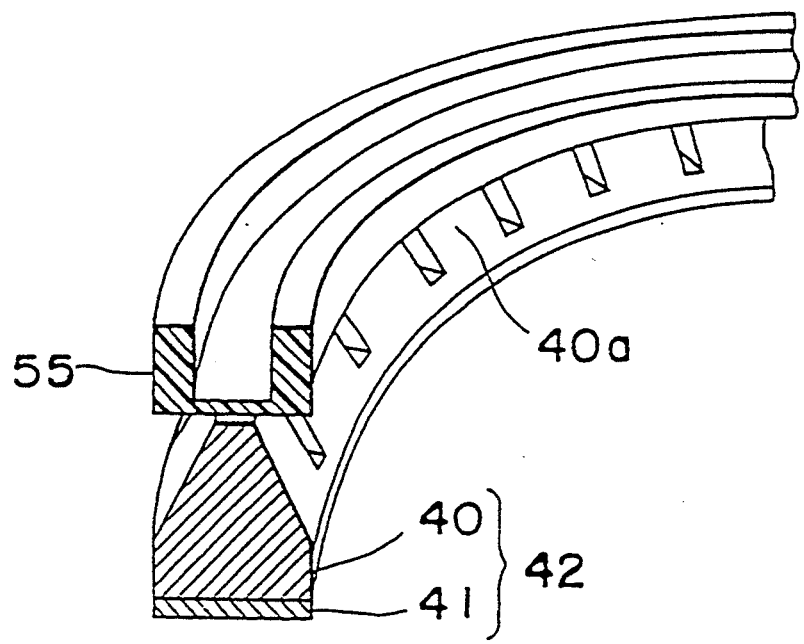
FIG. 8b is an enlarged sectional view of a moving body shown in FIG. 8a, FIG. 9a is a partial perspective view of the major components of an ultrasonic motor according to a ninth preferred embodiment of the present invention.

First, a ring-shaped vibrating body 42 was constructed by affixing with adhesive a ring-shaped piezoelectric body 41 to the bottom of a stainless steel, ring-shaped elastic base board 40 with plural trapezoidal projections 4a. By injection molding a mixture of 30 wt % carbon fiber and 70 wt % polyphenylene sulfide resin, a moving body 55 of a carbon fiber reinforced resin composite material with a ring shape and specific gravity of 1.45 is obtained, Moreover, by setting the moving body 55 pressed in contact with the vibrating body 42 by means of a disc spring (not shown), a ring-shaped ultrasonic motor as illustrated in FIG. 8a can be composed.

Figure 8B:
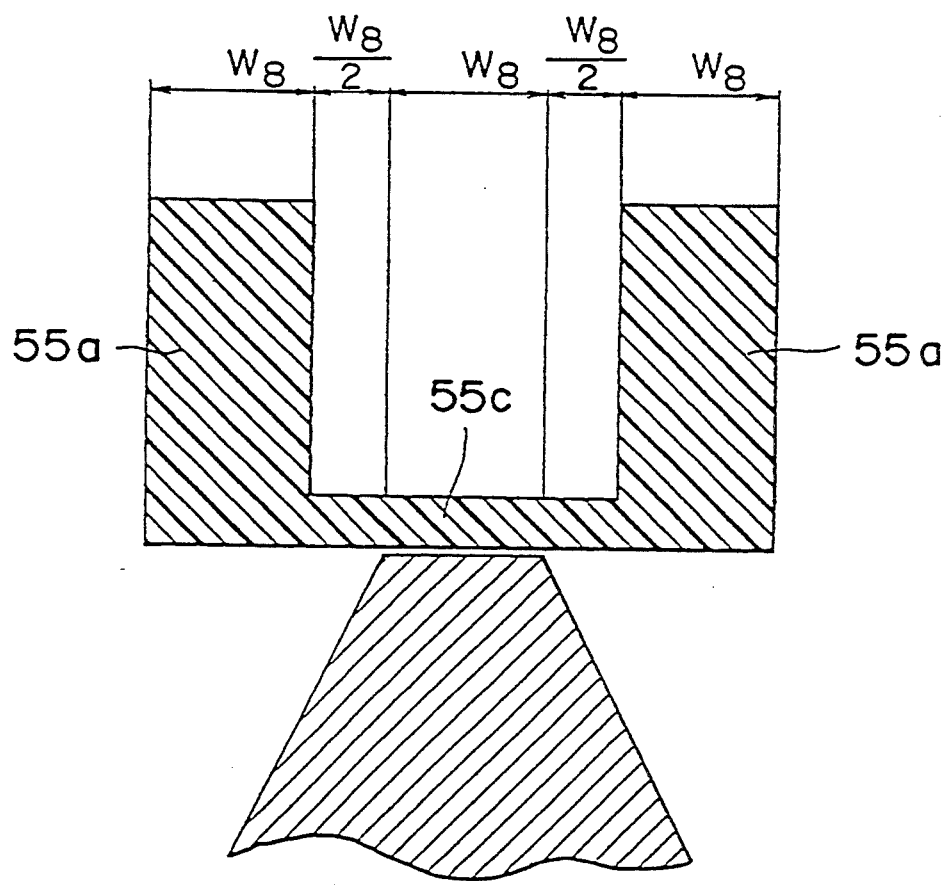

As shown in FIG. 8b, if the width of a beam member contacting the vibrating body 42 is $W_8$, the total width of the moving body beam member 55c in this moving body 55 is $2W_8$, moving body projections 55a have a width of $W_8$, and, accordingly, the moving body contacts the vibrating body 42 at a width of $W_8$.

It is to be noted that the widths of the moving body beam member should not be so limited, but because the optimum width and thickness of the moving body beam member differs with the pressure applied by the ultrasonic motor, it is necessary to be able to adjust the elasticity in the direction of force of the moving body 55 by adjusting the width or thickness of the moving body beam member.

Ninth preferred embodiment

Figure 9A:
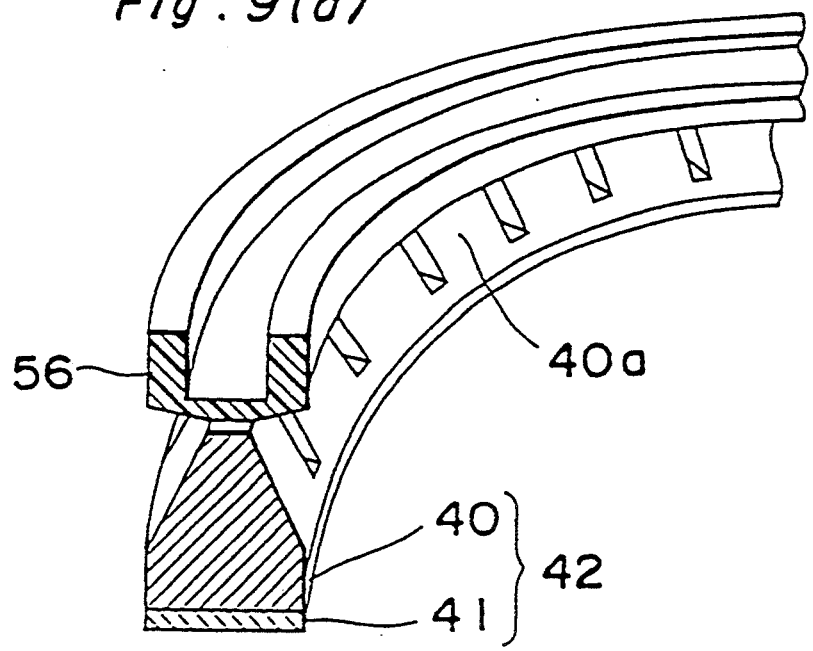
FIG. 9b is an enlarged sectional view of a moving body shown in FIG. 9a, FIG. 10a is a partial perspective view of the major components of an ultrasonic motor according to a tenth preferred embodiment of the present invention.

First, a moving body 56 of a carbon fiber reinforced resin composite material with a ring shape and specific gravity of 1.44 is obtained by injection molding a mixture of 30 wt % carbon fiber and 70 wt % polyether ether ketone resin. Furthermore, by setting the moving body 56 pressed in contact with the vibrating body 42 according to the eighth embodiment of the invention by means of a disc spring (not shown), a ring-shaped ultrasonic motor as illustrated in FIG. 9a can be composed.

Figure 9B:
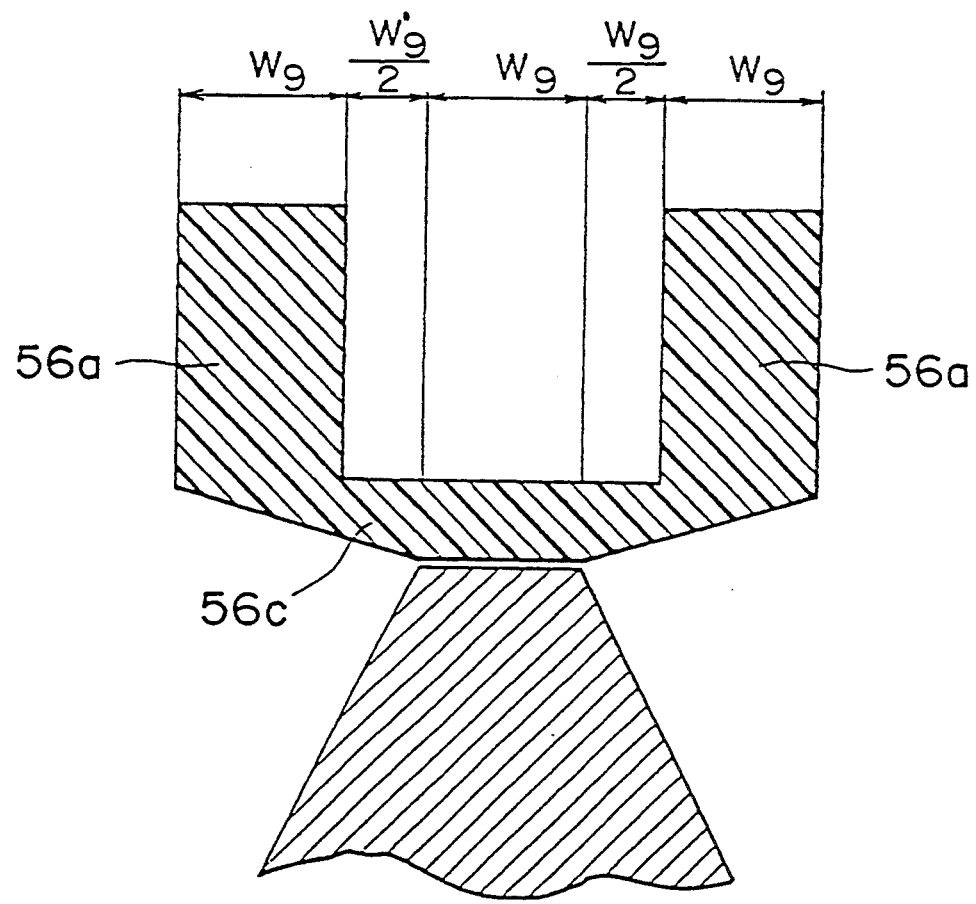

As shown in FIG. 9b, the width of a beam member contacting the vibrating body 42 is $W_9$, this moving body 56 has a length of $2W_9$ along the moving body beam member 56c, moving body projections 56a have a width of $W_9$, and tapered surfaces are on the contact surface side of the moving body beam member 56a, which contacts the vibrating body 42 at a width of $W_9$.

By thus providing a taper at the contact side of the moving body beam member, the surface compensation effect can be increased and the rigidity in the contact part of the moving body can be increased.

Tenth preferred embodiment

First, a moving body 57 of a carbon fiber reinforced resin composite material with a ring shape and specific gravity of 1.47 is obtained by injection molding a mixture of 30 wt. % carbon fiber and 70 wt % polyether sulfone resin. Furthermore, by setting the moving body 57 pressed in contact with the vibrating body 42 according to the eighth embodiment of the invention by means of disc springs (not shown), a ring-shaped ultrasonic motor as illustrated in FIG. 10a can be composed.

Figure 10:
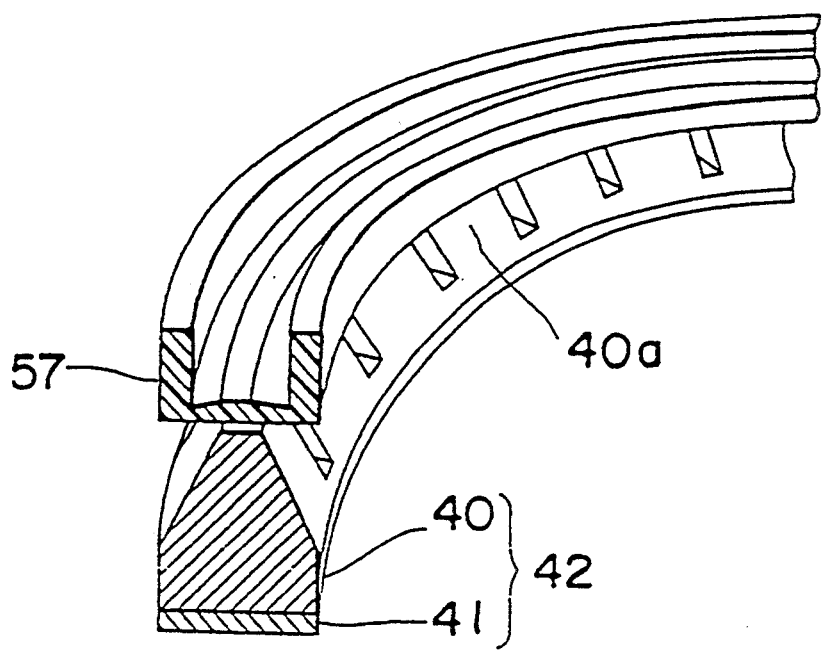
FIG. 10b is an enlarged perspective view of a moving body shown in FIG. 10b.
Figure 10:
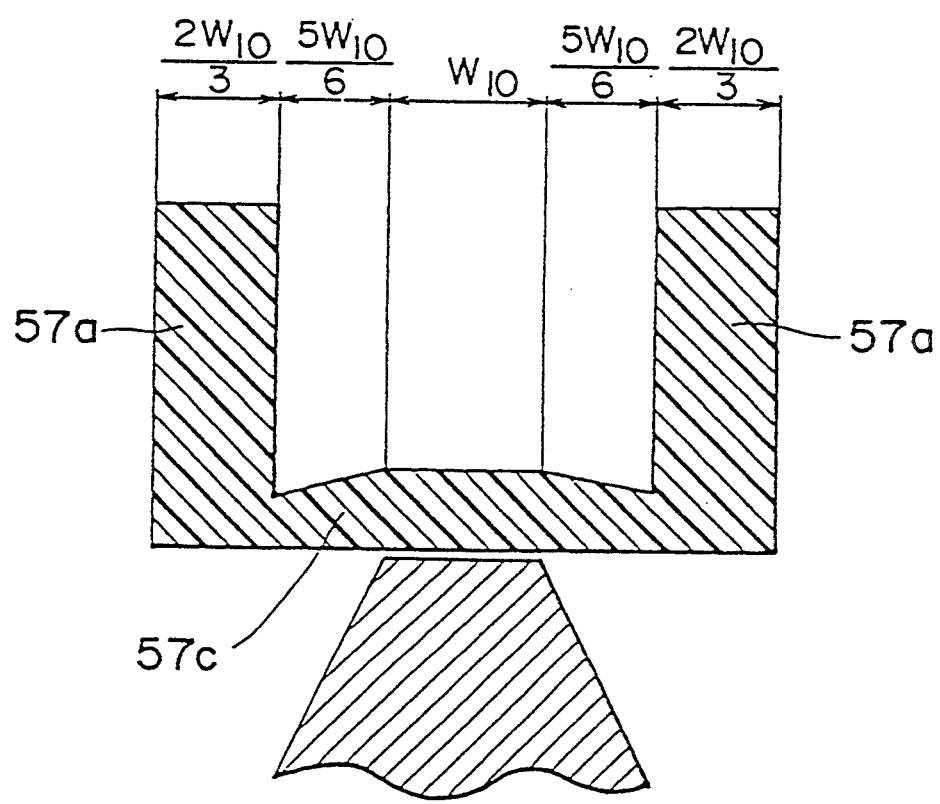
Figure 11A:
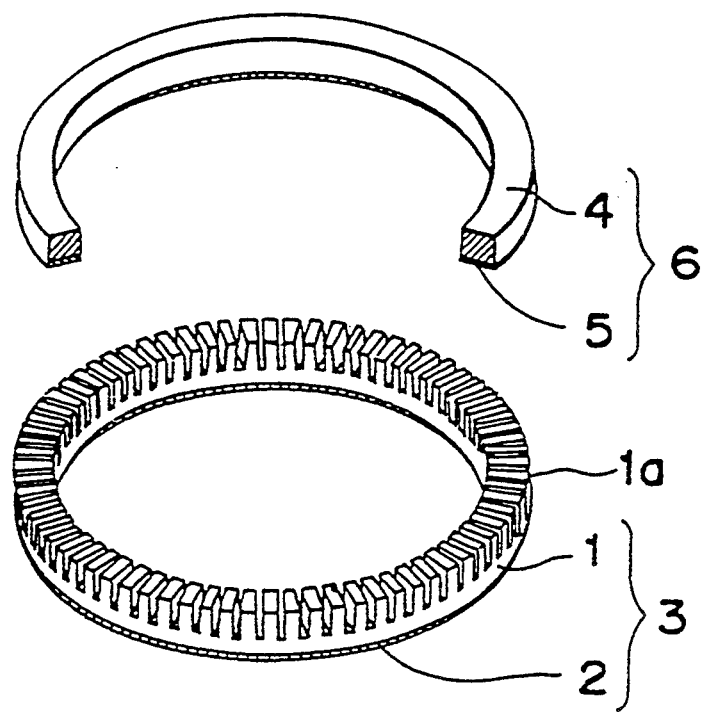
FIG. 11a is a disassembled perspective view of the main structural parts of a conventional ring-shaped ultrasonic motor.
Figure 11B:
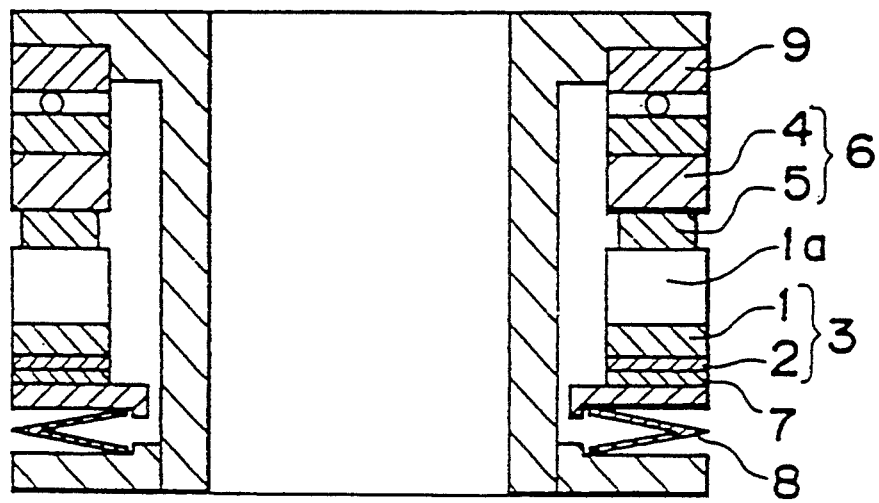
FIG. 11b is a cross-sectional view of a conventional ring-shaped ultrasonic motor.

As shown in FIG. 10b, the width of the bottom of the moving body 57 in contact with the vibrating body 42 is $W_{10}$. This moving body 57 has a width of $8W_{10}/3$ along a moving body beam member 57c, moving body projections 57a have a width of $2W_{10}/3$, and taper surfaces with different angles are on the back side of the moving body beam member.

By specifically providing a greater taper at the outside circumference of the moving body than the inside circumference, a greater surface compensation effect can be obtained at the outside than at the inside circumference of the moving body, and a design which allows for radial amplitude in which the amplitude in the radial direction of the ring-shaped vibrating body is greater at the outside circumference can be obtained.

As described by means of the above ten embodiments, an adhesive process to bond the friction material to the metallic elastic body is not required as it is with a conventional ring-shaped ultrasonic motor by composing the moving body of a carbon fiber reinforced resin composite material reinforced by at least carbon fiber, and the moving body can be easily molded using dies by either injection, compression, or other molding processes.

Moreover, by means of the present invention, the weight of the moving body can be reduced in comparison with the weight of a moving body of equal size constructed of a friction material bonded to a stainless steel elastic body as in a conventional ring-shaped ultrasonic motor.

Specific embodiments of the present invention were described hereinabove, but it should be noted that in the above ten embodiments the carbon fiber content of the carbon fiber reinforced resin composite material comprising the moving body is adjustable according to the pressure of the ultrasonic motor, but when the fiber content is $\leq 5$ wt % the effect is to reduce the rigidity enhancing effect, and the wear resistance of the friction contact surface of the moving body is insufficient. When the fiber content exceeds 50 wt %, molding becomes difficult, though the specific degree varies with the molding method and fluidity of the resin, and the mechanical strength of the molding becomes brittle. Therefore, the required fiber content range is $5 \leq 50$ wt %. The preferable range is $15 \leq 35$ wt % due to an overall consideration of the material characteristics required in the moving body, the moldability of the moving body, and the cost of the moving body.

Furthermore, carbon fiber is used as the type of reinforcing fiber in these embodiments, but it is also possible to use inorganic fibers other than carbon fiber to be used in combination with carbon fiber, and it is also possible to use inorganic fillers such as graphic powder, tetrafluoride ethylene powder, molybdenum sulfide powder, or graphite fluoride powder to adjust the lubricity of the moving body.

In addition, thermoplastic resins such as polyphenylene sulfide resin, polyether ether katone resin, and polyether sulfone resin are used as the carbon fiber reinforced resin composite material in the above ten embodiments, but the invention shall not be thus limited.

As a guide to the selection of resins to form this carbon fiber reinforced resin composite material, the heat resistance of the material should be $\geq 150°$ C., and it is preferable to use a resin with a high temperature of heat deformation. This is because when a resin with heat resistance $\leq 150°$ C. and a low temperature of heat deformation, wear of the friction contact surface of the moving body is accelerated and it is difficult to assure long-term reliability because of the resulting deterioration in motor performance.

Considering these observations, it is also possible to use, in addition to the resins used in the above embodiments, thermoplastic resins such as polysulfone resin, polyarylate resin, polyamideimide resin, polyetherimide resin, polyimide resin, and all aromatic polyester resins, or thermosetting resins such as phenol resin, bismaleimide-triazine resin, or polyimide resin.

The following effects are obtained as the cumulative result of constructing an ultrasonic motor according to the present invention with a moving body of a carbon fiber reinforced resin composite material and rigidity according to the pressure applied by the ultrasonic motor in the direction of force to the moving body:

a) an ultrasonic motor with high output transfer efficiency can be achieved,
b) an ultrasonic motor with excellent long-term reliability can be achieved,
c) the manufacturing process for the moving body can be simplified, and
d) the weight of the ultrasonic motor can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An ultrasonic motor comprising:
a moving body; and
a vibrating body, said moving body being pressed against said vibrating body for movement of said moving body in a direction of movement by the friction force between said moving body and said vibrating body when said vibrating body is excited to generate a progressive wave of flexural vibration therein;
wherein said vibrating body comprises a piezoelectric body bonded to an elastic base board; and
wherein said moving body comprises a one-piece body formed by resin molding of a resin composite material reinforced with at least carbon fibers, said one-piece body including a beam extending in the direction of movement of said moving body, said beam having lateral ends thereof, a first projection projecting upwardly from one said lateral end and defining a pressure receiving surface, and a second projection projecting downwardly from the other said lateral end toward said vibrating body and defining a sliding contact surface maintained in direct press contact with said vibrating body;
wherein said beam has a width L and a thickness T, said second projection has a width $W_2$ and a height H, $L/T<2$, $H/L\leq 2$ and $0.3\ mm \leq W_2 \leq 2.0\ mm$.

2. An ultrasonic motor arrangement, comprising:
a moving body; and
a vibrating body, said moving body being pressed against said vibrating body for movement of said moving body in a direction of movement by the friction force between said moving body and said vibrating body when said vibrating body is excited to generate a progressive wave of flexural vibration therein;
wherein said vibrating body comprises an elastic baseboard and a piezoelectric body bonded to said elastic base board; and
wherein said moving body consists essentially of a one-piece body formed by resin molding of a resin composite material reinforced with at least carbon fibers, said one-piece body including a beam extending in the direction of movement of said moving body, said beam having lateral ends thereof, a first projection that projects upwardly from one said lateral end and defines a pressure receiving surface, and a second projection that projects downwardly from the other said lateral end toward said vibrating body and defines a sliding contact surface that is maintained in direct press contact with said vibrating body;
wherein said beam has a width L and a thickness T, said second projection has a width $W_2$ and a height H, $L/T<2$, $H/L\leq 2$ and $0.3\ mm \leq W_2 \leq 2.0\ mm$.

* * * * *